United States Patent [19]

Burt

[11] 3,958,102
[45] May 18, 1976

[54] INVENTORY TAKING SYSTEM FOR AN AUTOMATIC WAREHOUSE

[75] Inventor: Harold S. Burt, Mendota, Ill.

[73] Assignee: Conco Inc., Mendota, Ill.

[22] Filed: Oct. 21, 1974

[21] Appl. No.: 516,627

[52] U.S. Cl. .................... 235/61.6 R; 235/61.7 R; 235/61.11 R; 235/61.11 E; 214/16.4 A
[51] Int. Cl.² .................... G06K 7/015; G06K 7/14; B65G 47/00
[58] Field of Search ............. 340/146.3 K; 250/568, 250/569, 570; 235/61.11 E, 61.11 R, 61.6 R, 61.7 B; 198/38; 214/16.4 A, 16.4 B; 235/61.7 R

[56] References Cited
UNITED STATES PATENTS

| | | | |
|---|---|---|---|
| 3,018,947 | 1/1962 | Harruff | 235/61.11 C |
| 3,402,836 | 9/1968 | Debrey | 214/16.4 |
| 3,553,433 | 1/1971 | Sorli | 235/61.7 R |
| 3,617,707 | 2/1971 | Shields | 235/61.11 E |
| 3,646,890 | 3/1972 | Snyder | 214/16.4 A |
| 3,691,398 | 9/1972 | Burch | 214/16.4 A |
| 3,724,699 | 4/1973 | Weston | 214/16.4 A |
| 3,876,863 | 4/1975 | Boone | 235/61.7 R |
| 3,881,053 | 4/1975 | Lemelson | 178/6.8 |

Primary Examiner—Daryl W. Cook
Assistant Examiner—Robert M. Kilgore
Attorney, Agent, or Firm—Wegner, Stellman, McCord, Wiles & Wood

[57] ABSTRACT

A stacker crane is movable along horizontally spaced and vertically stacked bins to deposit and retrieve palletized loads comprised of stacked articles, at least some of which contain an inventory label. To take a physical inventory, an inventory pallet is carried on the transfer forks of the stacker crane. The inventory pallet contains a laser beam scanner which directs a scanning beam toward the rear of the palletized load. The stacker crane is automatically driven through a sequence which causes it to pass each bin in the warehouse. When the crane reverses direction, the laser beam scanner is driven along guides to an end location, and rotated 180°, to scan bins on the opposite side of the aisle. The scanned inventory data is remotely transmitted with the bin address data to an off-crane data recorder.

17 Claims, 7 Drawing Figures

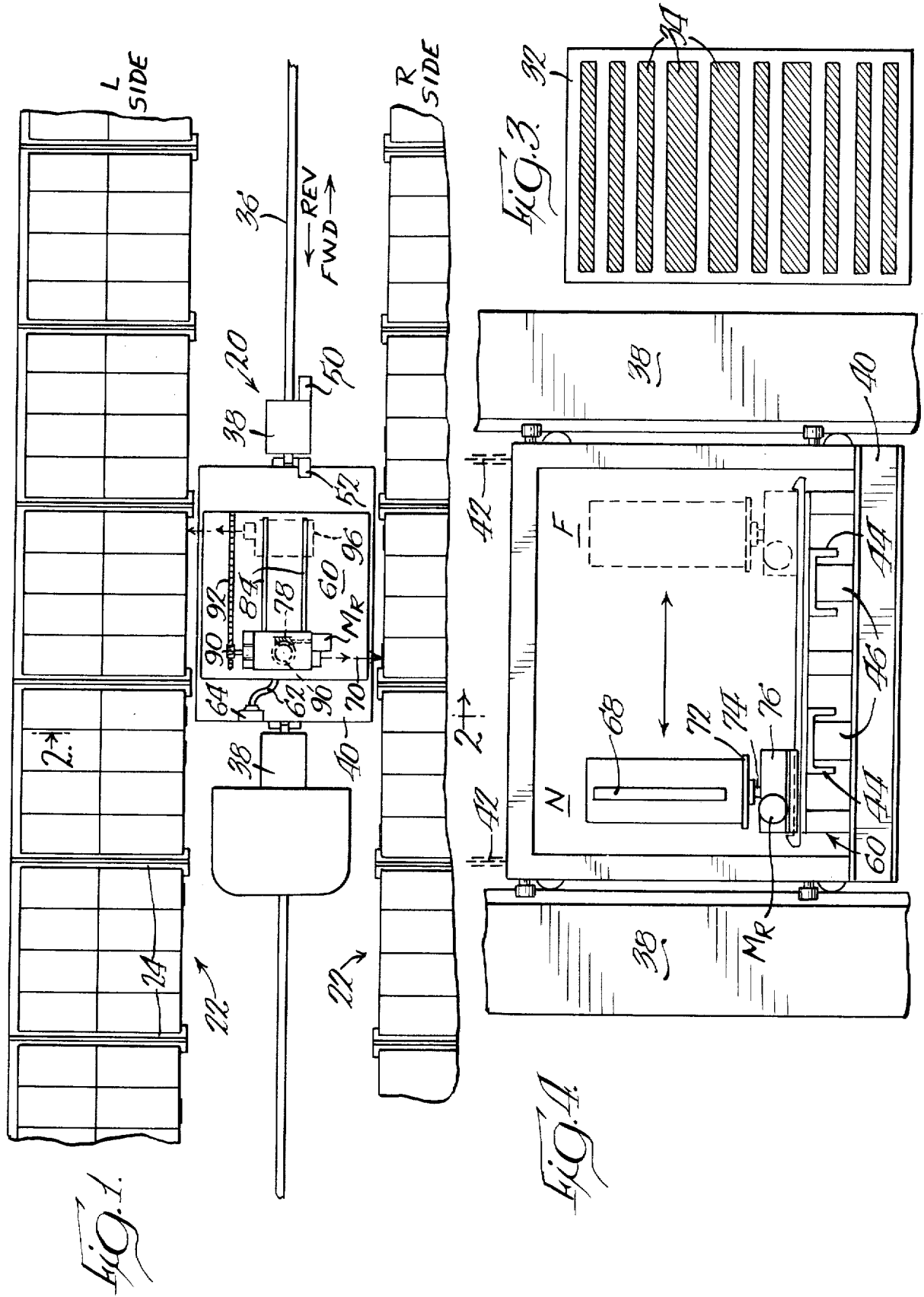

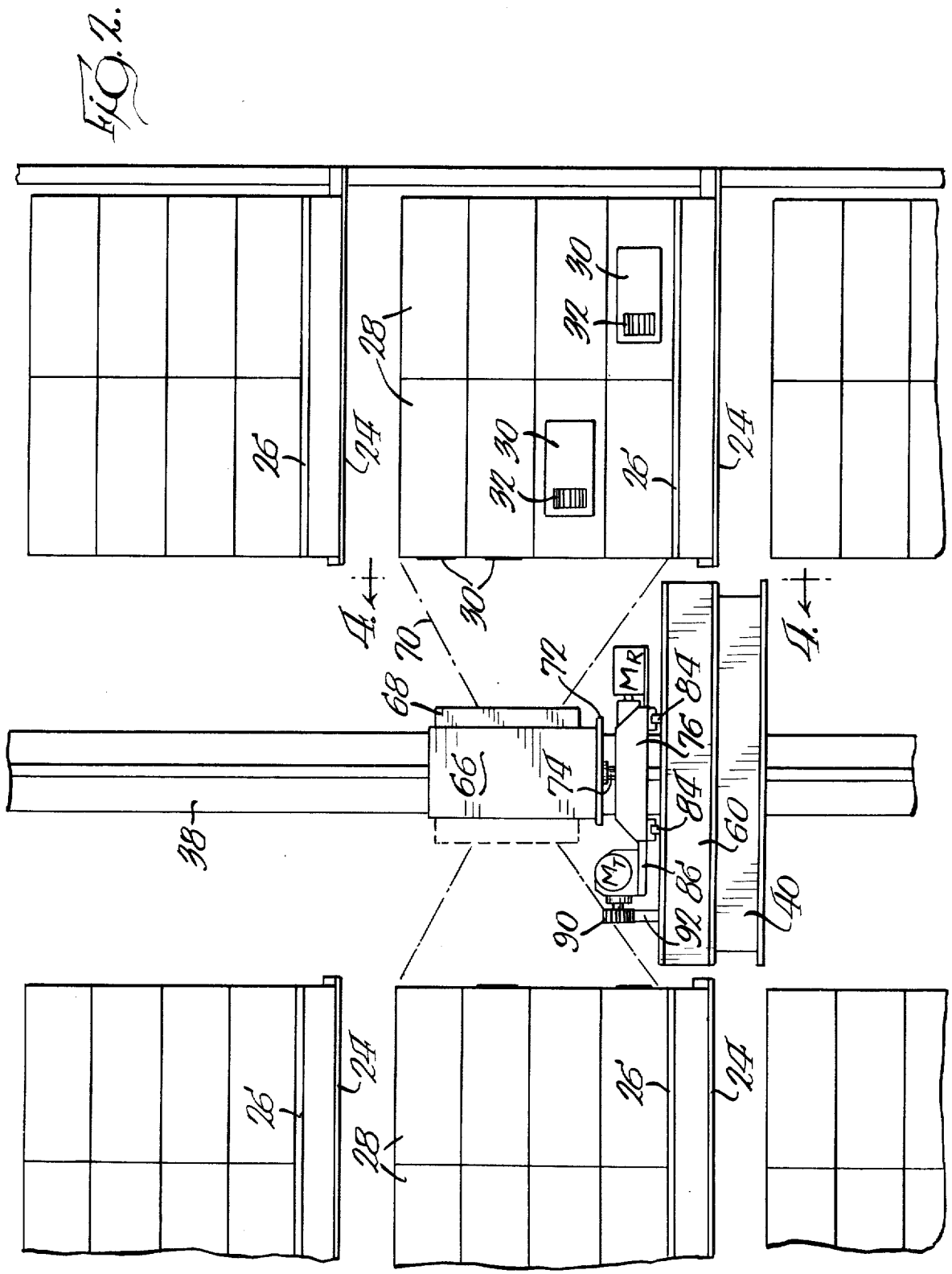

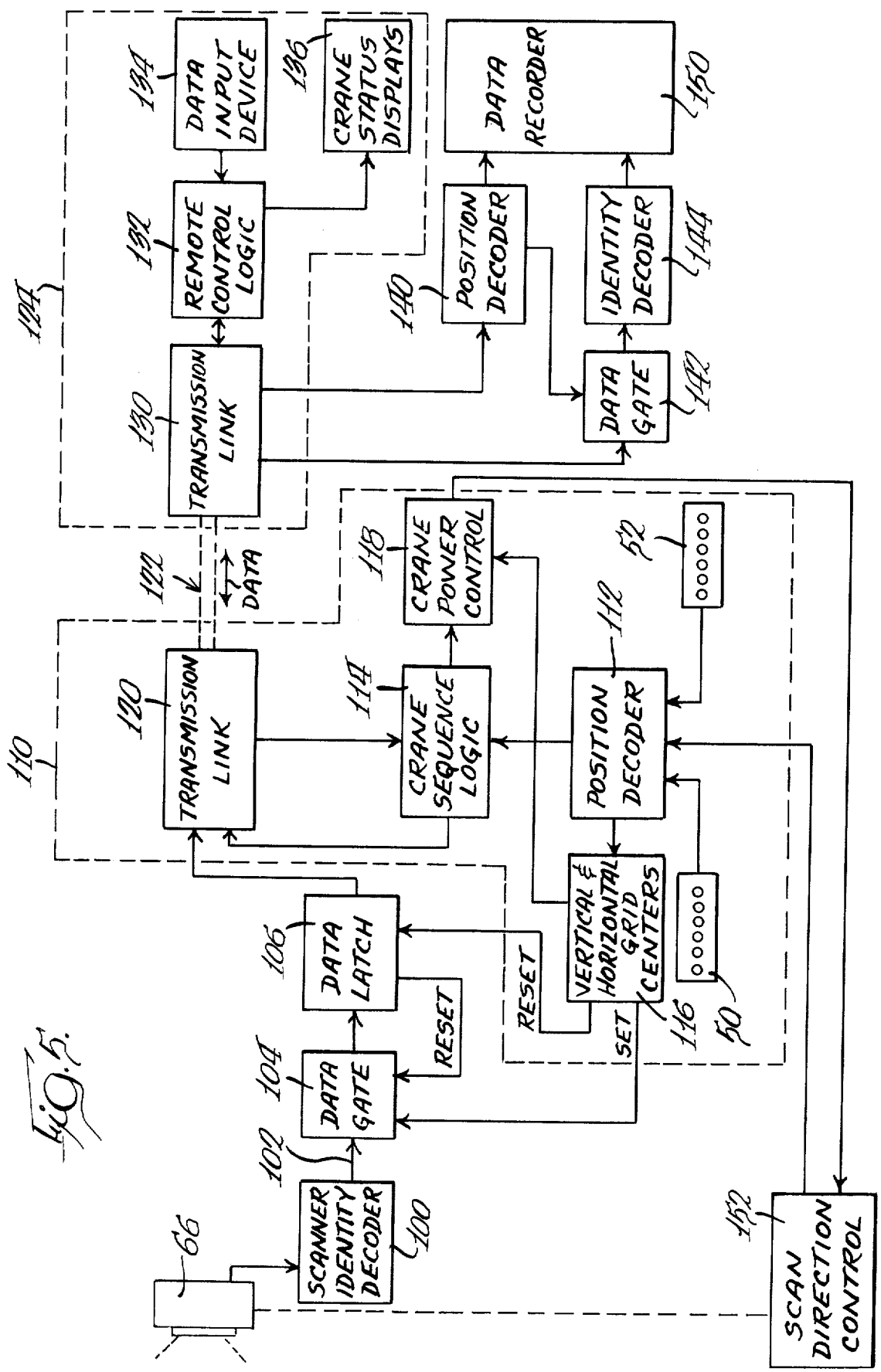

INVENTORY TAKING SYSTEM FOR AN AUTOMATIC WAREHOUSE

BACKGROUND OF THE INVENTION

This invention relates to a system for automatic recording of inventory stored in spaced bins of an automatic warehouse.

Inventory taking has been accomplished by computer monitoring of all movements of products within a high rise warehouse. In some situations, however, the maintenance of continuous inventory records is not justified, and pallets may be stored at any empty bin in a storage framework. In either situation, it may be desirable to make a periodic physical inventory check of the actual contents of the warehouse.

Manual inventory taking in a high rise stacker warehouse is accomplished by having an operator ride the stacker crane, and manually record the contents of products in the rack storage structure. Such manual inventory taking involves the inaccuracies inherent in any manual recording system, and is a slow and time consuming process.

In simple conveyor systems, it has been possible to locate an inventory scanner at a fixed location along the conveyor. Each time an article is conveyed in front of the scanner, the scanner is activated to record the contents of the article being transported. The problems involved in a conveyor system are considerably simplier than the inventory taking problems in a high rise automatic warehouse, and the equipment developed for conveyor inventory taking is not directly applicable to high rise warehouses.

SUMMARY OF THE INVENTION

In accordance with the present invention, an automatic inventory taking unit is locatable on the vehicle carriage which contains the load transfer device for an automatic warehouse, and is remotely controlled to physically take inventory with little or no manual intervention. An inventory scanner is mounted on a pallet carried by the transfer device, and scans inventory labels as the vehicle carriage is automatically driven through a predetermined sequence of operation. A correlating unit associates the read inventory data with the bin addresses read by an address scanner, and remotely communicates the correlated data over the standard stacker crane communication system.

One object of this invention is the provision of a remotely controlled inventory taking unit for use in an automatic warehouse in which loads are spaced along a storage framework and a load transport vehicle is driven along the framework.

Other objects and features of this invention will be apparent from the following description, and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 1 is a top plan view of a stacker crane located in an aisle of an automatic warehouse, and having a novel inventory taking unit located on the transfer forks of the stacker crane;

FIG. 2 is a vertical section taken along lines 2—2 of FIG. 1 and showing the inventory equipment pallet in more detail;

FIG. 3 is an enlarged plan view of a portion of the inventory labels seen in FIG. 2;

FIG. 4 is a side plan view of the inventory equipment pallet, taken along lines 4—4 of FIG. 2;

FIG. 5 is a schematic diagram of the control system for the inventory taking unit.

DESCRIPTION OF THE PREFERRED EMBODIMENT

Figure 6B:
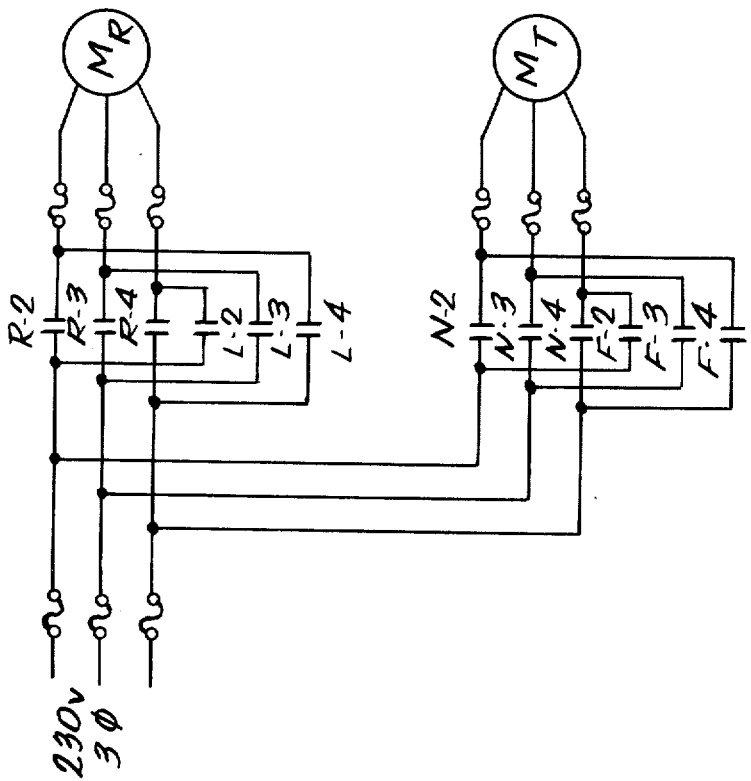
FIGS. 6A and 6B are across-the-line diagrams of the scan direction control shown in block form in FIG. 5.

Turning to FIGS. 1, 2 and 4, a stacker crane 20 is movable along a travel zone or warehousing aisle located between a pair of spaced storage frameworks 22 each defining a plurality of horizontally spaced and vertically stacked load supports or bins. Each bin includes a pair of L-shaped rails 24 which support the feet of pallets 26 which hold stacked articles 28. For inventory identification, each article 28 contains a label 30 carrying the usual product description and an inventory code 32 which can be scanned by a light beam for product identification.

As seen in FIG. 3, the inventory code 32 consists of a plurality of horizontal bars 34, which can also be circular, i.e. bull's-eye, slanted, etc., of varying widths, position or color, representing binary or other types of coding methods. Each bar is reflective, that is, it has sufficient contrast or other visible or non-visible light characteristics so as to be optically readable when a light beam vertically scans the code 32. Alternatively, the horizontal bars 34 may be optically non-reflective and the background may be reflective.

Returning to FIGS. 1, 2 and 4, the labels 30 are located on each article 28, but only one label 30 need face outward from each side of the palletized load when all articles are the same on a pallet. Thus, the pallet 26 can be oriented in any direction within the bin, and still be readable for inventory taking.

Stacker crane 20 has a lower carriage movable along a floor mounted rail 36, with the lower carriage supporting a pair of crane columns 38 for vertical guiding of a crane hoist carriage 40. A pair of hoist chains 42, FIG. 4, connect the hoist carriage 40 to an upper hoist motor (not illustrated) located at the top of the stacker crane, for vertical movement of the hoist carriage.

For load transfer, an extendable transfer device such as a pair of conventional transfer forks 44 are driven horizontally and vertically by a fork drive mechanism 46 mounted on the hoist carriage 40. To deposit a pallet, the forks 44 extend to either side of the aisle, in an elevated position, and then are vertically lowered to deposit the pallet on the L-shaped rails 24 before being retracted back to center. For retrieving a pallet, the cycle of operation is repeated in the reverse direction, with the forks extending low and retracting high, as is conventional.

Each bin is uniquely identified in the warehouse grid by horizontal and vertical coded addresses. Each horizontal address is generally formed by a separate binary coded address plate mounted to the floor rail 36, and scanned by a plurality of photobeams from a horizontal position scanner 50 mounted on the lower carriage of the stacker crane. Each vertical address is represented by a separate code plate, having a binary address or an increment countable extension, mounted to one of the columns 38 and read by a vertical position scanner 52 fixedly mounted on the hoist carriage. Each pair of horizontal and vertical addresses is oriented so that the transfer fork 34 is centrally located adjacent to a bin opening, for fork extension and retraction when the addresses are being read by the scanners 50 and 52. The above described stacker crane and storage framework are conventional, to the extent described so far, and may take a variety of forms without departing from the present invention.

When the stacker crane 20 has completed a deposit or retrieve operation, and it is desired to automatically take the inventory of the warehouse, the stacker crane is driven to its home station and the forks 44 are extended low to pick up the novel inventory equipment pallet 60. The portable pallet 60 is then locked onto and carried by the transfer forks 44, which are located in their central pallet carrying position, during the entire inventory taking operation. A control and power cable 62 is manually plugged in to a receptacle 64 located on the hoist carriage 40. The inventory pallet 60 contains a laser beam scanner 66 having a lens assembly 68 which produces a thin vertical scanning curtain 70 as a laser beam is rapidly reciprocated in a vertical direction. Upon striking the reflective portions of the code 32, the light beam is reflected back to the lens assembly and directed to a decoder to determine the presence of the bars. The laser beam scanner 66 and associated decoder is conventional, per se, and may use a helium neon laser beam directed through a split mirror onto a rapidly rotating mirror which bounces the laser beam onto a fixed mirror. The returning reflected light beam will follow the same path back to the split mirror, and then be reflected to a photoelectric sensor. Because the rotating mirror spins at a very high rate of speed, the laser beam appears to the eye as a thin, continuous wedge or curtain of light. Such scanners have a wide tolerance to label skew and label tilt, and can detect a code bar pattern printed on the side of a cardboard or similar container.

The laser beam scanner 66 is mounted on a rotatable platform 72 attached by a vertical shaft 74 to a carriage base 76. A rotating motor $M_R$ is fixedly mounted to the carriage base 76 and rotates a worm screw 78, FIG. 1, which meshes with a gear 80 in order to rotate or index the laser beam scanner by 180°.

The carriage base 76 is mounted for traverse movement along a pair of traverse guides 84, generally parallel with the warehousing aisle and the horizontal rail 36, which extend on the inventory pallet 60. The carriage 76 has an extension 86 mounting a traverse motor $M_T$ which rotates a pinion 90 engaging a fixed chain, or a rack 92 spaced from and parallel to the traverse guides 84. When the traverse motor $M_T$ is energized, it drives the base carriage 76 to the opposite side of the inventory pallet, as shown by the dashed lines 96. At the same time, the rotating motor $M_R$ is energized so as to rotate the laser beam scanner 66 by 180°, in preparation for the stacker crane 20 being driven in the reverse direction along the warehousing aisle.

The inventory taking operation will now be generally described. After receiving the inventory pallet 60 which is connected through cable 62 to the crane power and control lines, a remote computer automatically drives the stacker crane past all bins in the warehouse, following a systematic path. Beginning with the first bin next to the home station, the stacker crane is driven horizontally along the right R side of the warehousing rack, in a forward FWD direction. Of course, the side and direction designations are arbitrary, and herein are referenced with respect to the home station, which would be located to the left as illustrated in FIG. 1. As the stacker crane is driven past each bin, information from the scanning means 70 is entered beginning when the crane reaches the center bin position, at which time the scanning beam is oriented at the rear of the associated bins.

At the far end of the aisle, the stacker crane stops, and the motors $M_T$ and $M_R$ are energized so as to traversely drive the scanner across the inventory pallet, and rotate the scanner by 180°, so as to be in the position 96. When the laser beam scanner reaches position 96, the stacker crane is driven in the reverse REV direction back along the same first shelf elevation. The scanner 66 now records the identity of labels read along the left L side of the aisle.

Upon reaching the near end of the aisle, the stacker crane stops horizontal movement, and the hoist carriage 40 is lifted to the second shelf elevation. Both motors $M_T$ and $M_R$ are energized so as to return the scanner 66 to its original position as illustrated in FIG. 1. The stacker crane is now positioned the same as originally described, and the same sequence of operation is repeated. Thus, all bins along each shelf elevation are scanned until the crane is driven in the reverse direction to the near side of the top shelf elevation. The crane is then driven to its home station, where an operator removes cable 62 from the receptacle 64, unlocks the portable pallet 60, and the transfer forks 44 are extended to deposit the inventory pallet 60 at the home station.

In FIGS. 5 and 6, the control system for the inventory taking system is illustrated in detail. As shown in FIG. 5, the inventory scanner 66 has an output coupled to a conventional scanner identity decoder 100 which produces on a line 102 binary bits representing the code bars 34 shown in FIG. 3. When the crane reaches the first horizontal and first vertical rack grid center, the center bin position is detected by the standard on-crane control system 110 which is the same, except for the illustrated interconnections, to a conventional remote controlled on-crane control system. Information from the horizontal address scanner 50 and the vertical address scanner 52 indicates to a position decoder 112, when the center bin position is reached, and also provides corresponding horizontal and vertical address data to a crane sequence logic unit 114. Upon reaching a bin center, a center bin signal is provided to a crane power control 118 to enable a fork deposit of retrieval operation assuming that the logic 114 has enabled such an operation. Now, however, the center bin signal is used as a reset signal which clears the data latch 106, and as a set signal which opens the data gate 104.

As the crane continues its horizontal motion, the scanner 66 will now begin to receive reflected code indicating signals which now will be passed through the opened data gate 104 to the memory or data latch 106, which has storage positions for each bit position. When all bit positions are filled, the memory data latch 106 generates a reset signal which closes the data gate 104 to prevent further coded bits from being stored.

The standard on-crane control system 110 includes a transmission link 120 which transmits data over a communication bus 122 to a standard remote control system 124. The communication bus 122 may take a variety of forms, such as bus lines coupled by sliding contacts with the stacker crane, or looped cable which is fed out to the stacker crane, or an energy wave communicaton system.

The standard remote control system 124 consists of a receiving and transmitting transmission link 130 under control of a remote control logic unit 132. A data input device 134, such as a card reader, manual input switches, or a warehousing control computer, provides input information for positioning control of the stacker crane. The logic 132 also supplies status information to crane status displays 136 for visual indication of crane position, deposit or the retrieve operation, and the like.

Returning to the on-crane control system, the transmission link 120 serves as a coordinating unit and receives from the data latch 106 the read inventory code, and from crane sequence logic 114 the horizontal and vertical address data. Both inputs are converted into the code format for the crane "status" word, which status word is of course of increased length as necessary to accommodate the inventory data, and the status word is then transmitted over the bus 122 to the remote location. The transmission occurs before the crane reaches the next bin center position.

Upon receipt of the crane status word during an inventory taking cycle, the status word is transmitted to a position decoder 140 and a data gate 142. Upon decoding of the horizontal and vertical address by decoder 140, a signal opens the data gate 142 to transmit the inventory signal to a identify decoder 144. The vertical and horizontal address data is coupled from decoder 140 to a data recorder 150, which coordinates or records this information at the same time as it records the product inventory data decoded by decoder 144. Upon recording of both data, the decoder 140 closes the data gate 142. This operation continues for each bin along the aisle, thus recording the actual inventory of products located in each bin. As previously noted, this inventory taking system requires that all articles on a single pallet be the same. Of course, the system could be modified to record each data label on the pallet. In such a case, the articles would have to be arranged so that all data labels faced towards the warehousing aisle, in order that no label would be missed.

Figure 6A:
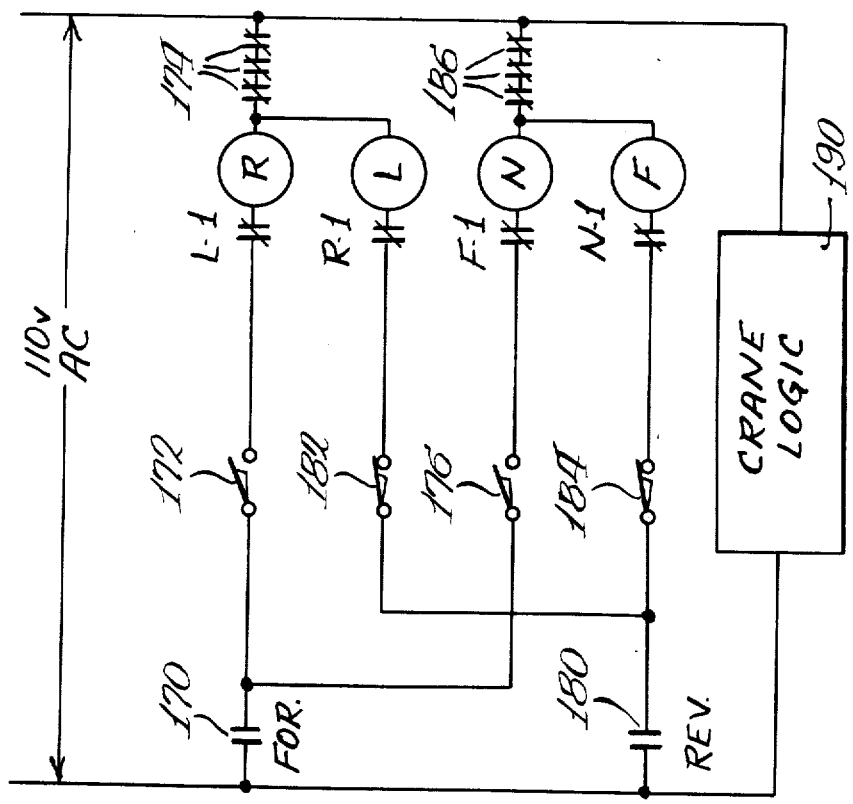

Upon reaching the end of the warehousing aisle, the crane power control 118 stops the cranes. This enables a scan direction control 152, shown in FIGS. 6A and 6B, which operates the motors controlling the inventory scanner 66. Turning to FIGS. 6A and 6B, rotation motor $M_R$ is energized from a three-phase AC source whenever a right side relay R or a left side relay L are energized to close their associated contacts 2, 3 and 4. Closure of the R contacts will rotate the scanner to the position illustrated in FIG. 1, whereas closure of contacts L will rotate the scanner to the position 96 for reading the left side rack. To move the scanner traversely across the pallet, the traverse motor $M_T$ may be energized by either a near relay N or a far relay F. Closure of contacts N rotates pinion 90 to drive the scanner to the position illustrated in FIG. 1, whereas closure of contacts F drives the scanner to the position 96 for reading the left side of the bins.

Turning to FIG. 6A, an extra forward direction contact 170, controlled by the standard crane forward relay which is a part of the standard sequence logic unit 114, is placed in series with a noramlly open limit switch 172 positioned on carriage 96 to engage platform 72 when the scanner platform has been rotated to the full right position (as illustrated in FIG. 1). The forward direction contact 170 is also coupled to a normally open limit switch 176 on pallet 60 which is tripped by the base carriage 76 when located in its full near position (as illustrated in FIG. 1). A series of overload contacts 174 connect the opposite sides of relay R and L to the opposite side of the AC source.

The standard crane control also includes a reverse direction relay which is a part of the standard sequence logic 114, and which closes an extra contact 180 when the crane is to travel in the reverse REV direction. This contact is coupled through a normally open limit switch 182 located on the base carriage 76 to engage the platform 72 when the scanner is rotated to the full left position 96 in FIG. 1. Contact 180 is also coupled through a normally open limit switch 184 located on pallet 60 and triggered by the base carriage 176 when driven to its full far position 96 in FIG. 1. A plurality of overload contacts 186 connect the opposite sides of relays N and F to the other side of the AC source. The remaining on-crane logic circuits for the inventory taking function are located within the crane logic block 190 and are energized by the 110 volt source.

The FIG. 6A circuit is illustrated in the state it will assume when the scanner 66 has been rotated to the full right and near positions, as illustrated in FIG. 1, which corresponds to its position when the crane is traveling in the forward direction. Upon reaching the end of the aisle, the standard crane control will enable the reverse relay, closing contact 180 and thereby energizing relays L and F. Energization of relay L opens contact L-1 in the series circuit connected to the R relay, and energization of relay F opens contact F-1 in the series circuit to the N relay. Closed contact 180 now also energizes motor $M_R$ to rotate the scanner counterclockwise as illustrated in FIG. 1, and energizes motor $M_T$ to move the scanner to the right as illustrated in FIG. 1.

Since all limit switches are normally closed, initial rotation of the platform and traverse movement of the carriage causes limit switches 172 and 176 to close. However, the R and N relays are not energized due to the open contact L-1 and F-1. The relays L and F remain energized to cause the motors to drive the scanner to the position 96 illustrated in FIG. 1. Upon indexing the full 180°, the platform will engage limit switch 182 and open its contact, terminating energization of relay L and hence opening power to $M_R$. Similarly, upon the base carriage reaching its full far position, it will open limit switch 184 and thereby de-energize relay F and hence open power to motor $M_T$.

After the crane has been driven in the reverse REV direction to the near end of the warehousing aisle, the standard stacker crane control will again energize the forward FOR relay and thereby close contact 170. This will allow power to travel through the now closed limit switches 172 and 176 to relays R and N, energizing the relays, and thereby opening their associated 1 contacts which are in series with the L and F relays. Initial movement of the scanner will now allow limit switches 182 and 184 to close, but will not energize the L and F relays. The scanner will now rotate and translate to the FIG. 1 position, at which time it will engage limit switches 172 and 176 and thereby open the contacts to terminate further energization of the motors. Thus, the scanner beam 70 is always aligned with the rear plane of the palletized load when the forks are centered on a bin.

Various modifications may be made without departing from the invention. The scanning path through the warehouse may be varied since the system always correlates the bin address with the inventory data. In place of the movable laser-beam scanner, a pair of fixed position scanners, one scanning the right side of the aisle and the other scanning the left side of the aisle, may be located on opposite ends of the inventory pallet. Alternatively, a pair of back-to-back scanners could be located on the traverse guide, with the rotating motor $M_R$ and associated platforms being eliminated. The scanners would simultaneously scan the right and left sides of the aisle, and would be driven to opposite positions as the crane hoist was elevated and then driven in the reverse direction. As another modification, a center mounted scanner, rotatable to read either side of the aisle, is usable if the pallet loads have all labels facing the warehousing aisle, thus eliminating the requirement that the full face of the load must be scanned for each bin. Other changes will be apparent in view of the above teachings.

I claim:

1. An inventory taking system for an automatic warehouse, comprising:
   a storage framework defining a plurality of spaced load supports, each load support being identifiable by an address;
   a load carrier movable along a travel zone adjacent the storage framework and including a transfer device extendable to deposit on and withdraw from the load support a load, each load being marked with an inventory indicia;
   an inventory scanner on the load carrier for reading the inventory indicia as the load carrier is moved past the loads stored in the storage framework;
   an inventory pallet carried by the transfer device as the load carrier is movable along the travel zone, the inventory scanner being mounted to the inventory pallet and having cable means for connecting the scanner to the load carrier;
   address means for identifying the address at which the transfer device is located; and and for recording the inventory indicia read by the inventory scanner with the address identified by the address means as the load carrier is driven past each load support.

2. The inventory taking system of claim 1 wherein the address means comprises address markers mounted at spaced locations to identify each load support, and an address scanner mounted on the load carrier for reading the address markers as the load carrier is moved past the load supports.

3. The inventory taking system of claim 2 wherein the recording means includes a memory for storing the read inventory indicia, and gating means coupled between the inventory scanner and the memory for passing the read inventory indicia to the memory when the address scanner is aligned with an address marker.

4. The inventory taking system of claim 3 including a transmission link for transmitting data from the load carrier to a remote data recorder, the recording means includes sequence logic means at the load carrier for coupling to the transmission link the read inventory indicia stored in the memory and the read address markers from the address scanner, and the remote data recorder includes a position decoder coupled to the transmission link for decoding the read address marker information and an identity decoder coupled to the transmission link for decoding the read inventory indicia information.

5. The inventory taking system of claim 1 wherein each load comprises a pallet containing a plurality of stacked articles, the inventory indicia comprises an optically scannable code marked on at least one of the articles facing the travel zone, and the inventory scanner comprises an optical beam scanner producing a light beam curtain extending vertically across the stacked articles in order to detect the optically scannable code as the light beam scanner is driven past the pallet by movement of the load carrier.

6. The inventory taking system of claim 1 wherein the inventory scanner is mounted at one end of the inventory pallet and has a sensing area aligned with an end of a load when the transfer device is centered on the associated load support.

7. The inventory taking system of claim 6 wherein the recording means includes a memory for storing the read inventory indicia, gating means for connecting the memory to the inventory scanner, and means enabling the gating means to pass the read inventory indicia when the transfer device is centered on the associated load support.

8. The inventory taking system of claim 7 wherein the address means comprises address markers mounted at spaced locations to identify each load support, an address scanner mounted on the load carrier for reading the address markers, decoder means coupled to the address scanner for producing a signal when the transfer device is centrally located on a load support, and the enabling means is responsive to the signal from the decoder means for enabling the the gating means.

9. An inventory taking system for an automatic warehouse, comprising:
   a storage framework containing a plurality of horizontally spaced and vertically stacked bins for supporting loads therein, each bin being at least partly identified by a separate address marker associated therewith;
   a stacker crane movable horizontally along a travel zone adjacent the storage framework and having a hoist carriage movable vertically to the vertically stacked bins, and the hoist carriage mounts a transfer device extendable into and retractable out of a bin to deposit in or withdraw from the bin a load;
   an inventory code carried by each load for identifying the load, the inventory code facing the travel zone when the load is deposited in the bin by the transfer device;
   an inventory scanner on the hoist carriage and aligned with one end of a load supported in a bin when the transfer device is centrally aligned for extension into or retraction out of the associated bin for reading the inventory code of the load in the bin adjacent the carriage to develop an inventory signal;
   an address scanner on the stacker crane for sensing the separate address markers to develop an address signal which identifies the bin at which the hoist carriage is adjacent; and
   means for correlating the inventory signal with the address signal in order to record the contents of each bin in the warehouse.

10. The inventory taking system of claim 9 wherein the stacker crane is movable in forward and reverse directions along the storage framework, and means responsive when the stacker crane is to travel in the reverse direction for moving the inventory scanner to a new location which aligns the inventory scanner with an opposite end of the load supported in a bin when the transfer device is centrally aligned therewith.

11. The inventory taking system of claim 9 wherein a second storage framework containing a plurality of horizontally spaced and vertically stacked bins is spaced from the first-named storage framework to define therebetween a travel aisle corresponding to the travel zone, the stacker crane being movable along the travel aisle to service bins located on either side of the aisle, the transfer device being extendable into bins located on either side of the travel aisle, and rotation means for rotating by 180° the inventory scanner in order to record the contents of bins in the second storage framework.

12. An inventory taking system for an automatic warehouse, comprising:
- a storage framework containing a plurality of horizontally spaced and vertically stacked bins for supporting loads therein, each bin being at least partly identified by a separate address marked associated therewith;
- a second storage framework containing a plurality of horizontally spaced and vertically stacked bins spaced from the first storage framework to define therebetween a travel aisle;
- a stacker crane movable in forward and reverse directions along the travel aisle to service bins located on either side of the travel aisle and having a hoist carriage movable vertically to the vertically stacked bins, and the hoist carriage mounts a transfer device extendable into and retractable out of bins on either side of the travel aisle, a traverse guide on the hoist carriage extending parallel with the travel guide, and a platform rotatably mounted to the traverse guide;
- an inventory code carried by each load for identifying the load, the inventory code facing the travel aisle when the load is deposited in the bin by the transfer device;
- an inventory scanner for reading the inventory code of the load in the bin adjacent the hoist carriage to develop an inventory signal, the inventory scanner being fixedly mounted to the platform, a first motor for rotating the platform when the stacker crane changes direction, and a second motor for moving the platform along the traverse guide when the stacker crane changes direction;
- an address scanner on the stacker crane for sensing the separate address markers to develop an address signal which identifies the bin at which the hoist carriage is adjacent; and
- means for correlating the inventory signal with the address signal in order to record the contents of each bin in the warehouse.

13. The inventory taking system of claim 12 including a power circuit coupled to an electric power source for energizing the first and second motors, said power circuit including a first branch coupled to a forward direction contact and a second branch coupled to a reverse direction contact, said contacts changing state when the stacker crane moves in the forward or reverse directions of travel, respectively.

14. In an automatic warehouse having a storage framework containing a plurality of spaced pallet supports for each supporting a pallet load consisting of a pallet with one or more articles locatable thereon, and a load carrier movable along a travel zone adjacent the storage framework and including a pallet transfer device extendable to deposit a pallet on and withdraw a pallet from the pallet support, an inventory taking system, comprising:
- at least one inventory code carried on each pallet load for identifying the one or more articles located on the pallet, the one inventory code being oriented to face the travel zone when the pallet is deposited on the pallet support by the pallet transfer device, and
- a portable inventory pallet locatable on the pallet transfer device to take an inventory of the articles in the storage framework, including an inventory scanner mounted on the inventory pallet and having a code sensing means facing the storage framework for reading the inventory codes when the pallet transfer device is adjacent the pallet supports, and cable means for connecting the inventory pallet to the load carrier to supply control and power signals between the load carrier and the inventory pallet.

15. The inventory taking system of claim 14 wherein the inventory pallet mounts traverse guide means extending generally parallel to the storage framework when the inventory pallet is located on the pallet transfer device, a carrier mounting the inventory scanner to the traverse guide means for traverse movement along the inventory pallet, and a motor for driving the carrier along the guide means.

16. The inventory taking system of claim 15 wherein the traverse guide means have a pair of stop sections spaced at generally opposite ends of the inventory pallet, a pair of limit switches located at the pair of stop sections and enabled by the carrier when adjacent the corresponding stop sections, and circuit means for energizing the motor including a stop branch responsive to enabling of the limit switches to terminating energization of the motor.

17. The inventory taking system of claim 14 in which a second storage framework contains a plurality of spaced pallet supports for supporting the pallet loads, the second storage framework being parallel to and spaced from the first-named storage framework to define a travel aisle corresponding to the travel zone, and the inventory pallet rotatably mounts a platform which is rotatably indexable by 180°, the inventory scanner being mounted to the platform, and a motor for rotating the platform by 180° to sense the inventory codes carried on pallets stored in the second storage framework.

* * * * *